(12) United States Patent
Deniau et al.

(10) Patent No.: US 8,742,914 B2
(45) Date of Patent: Jun. 3, 2014

(54) TIRE PRESSURE MONITORING APPARATUS AND METHOD

(75) Inventors: Jean-Christophe Deniau, Fenton, MI (US); Brian J. Farrell, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 161 days.

(21) Appl. No.: 13/206,225

(22) Filed: Aug. 9, 2011

(65) Prior Publication Data

US 2013/0038440 A1 Feb. 14, 2013

(51) Int. Cl.
*B60C 23/00* (2006.01)
*E01C 23/00* (2006.01)

(52) U.S. Cl.
USPC .............. 340/447; 340/448; 340/442; 73/146

(58) Field of Classification Search
CPC ............ B60C 23/0408; B60C 23/0462; B60C 23/0433
See application file for complete search history.

(56) References Cited

U.S. PATENT DOCUMENTS

| | | |
|---|---|---|
| 2,428,089 A | 9/1947 | Mumma et al. |
| 2,451,859 A | 10/1948 | Mumma et al. |
| 3,777,062 A | 12/1973 | Ogawa |
| 3,814,839 A | 6/1974 | Lubarsky et al. |
| 3,814,840 A | 6/1974 | Lubarsky et al. |
| 4,589,063 A * | 5/1986 | Shah et al. .......................... 710/8 |
| 4,703,359 A | 10/1987 | Rumbolt |
| 4,734,674 A | 3/1988 | Thomas et al. |
| 4,737,761 A | 4/1988 | Dosjoub et al. |
| 4,742,857 A | 5/1988 | Gandhi |
| 4,774,511 A | 9/1988 | Rumbolt et al. |
| 4,924,210 A | 5/1990 | Matsui et al. |
| 4,959,810 A | 9/1990 | Darbee |
| 4,999,622 A | 3/1991 | Amano et al. |
| 5,061,917 A | 10/1991 | Higgs et al. |
| 5,196,682 A | 3/1993 | Englehardt |
| 5,201,067 A | 4/1993 | Grube |
| 5,223,844 A | 6/1993 | Mansell |
| 5,228,077 A | 7/1993 | Darbee |
| 5,231,872 A | 8/1993 | Bowler et al. |
| 5,243,430 A | 9/1993 | Emmons |
| 5,255,313 A | 10/1993 | Darbee |
| 5,303,259 A | 4/1994 | Loveall |

(Continued)

FOREIGN PATENT DOCUMENTS

| | | |
|---|---|---|
| DE | 4492128 | 6/1996 |
| DE | 19503756 | 8/1996 |

(Continued)

OTHER PUBLICATIONS

International Search Report dated Apr. 6, 2012, from corresponding International Patent Application No. PCT/US2011/047087.

(Continued)

*Primary Examiner* — George Bugg
*Assistant Examiner* — Munear Akki

(57) ABSTRACT

Tire pressure information is sensed. The sensed tire pressure information is stored in a transmission buffer. A control program is executed to transmit the tire pressure information from the transmission buffer to an external receiver device according to each of a plurality of communications formats incorporated into the control program and not according to a manufacturers' code.

17 Claims, 5 Drawing Sheets

(56) References Cited

U.S. PATENT DOCUMENTS

| | | | |
|---|---|---|---|
| 5,335,540 | A | 8/1994 | Bowler et al. |
| 5,365,225 | A | 11/1994 | Bachhuber |
| 5,414,761 | A | 5/1995 | Darbee |
| 5,434,572 | A | 7/1995 | Smith |
| 5,455,570 | A | 10/1995 | Cook |
| 5,515,052 | A | 5/1996 | Darbee |
| 5,537,463 | A | 7/1996 | Escobosa |
| 5,540,092 | A | 7/1996 | Handfield et al. |
| 5,552,917 | A | 9/1996 | Darbee |
| 5,562,787 | A | 10/1996 | Koch et al. |
| 5,564,101 | A | 10/1996 | Eisfeld et al. |
| 5,581,023 | A | 12/1996 | Handfield et al. |
| 5,585,554 | A | 12/1996 | Handfield et al. |
| 5,600,301 | A | 2/1997 | Robinson, III |
| 5,602,524 | A | 2/1997 | Mock et al. |
| 5,614,906 | A | 3/1997 | Hayes |
| 5,624,265 | A | 4/1997 | Redford |
| 5,661,651 | A | 8/1997 | Geschke et al. |
| 5,663,496 | A | 9/1997 | Handfield et al. |
| 5,698,353 | A | 12/1997 | Jeong |
| 5,706,247 | A | 1/1998 | Merritt et al. |
| 5,731,516 | A | 3/1998 | Handfield et al. |
| 5,731,763 | A | 3/1998 | Herweck |
| 5,741,966 | A | 4/1998 | Handfield et al. |
| 5,768,499 | A * | 6/1998 | Treadway et al. .............. 714/46 |
| 5,808,558 | A | 9/1998 | Meek et al. |
| 5,838,229 | A | 11/1998 | Robinson, III |
| 5,841,390 | A | 11/1998 | Tsui |
| 5,844,131 | A | 12/1998 | Gabelmann et al. |
| 5,880,363 | A | 3/1999 | Meyer et al. |
| 5,883,305 | A | 3/1999 | Jo et al. |
| 5,900,808 | A | 5/1999 | Lebo |
| 5,926,087 | A | 7/1999 | Busch et al. |
| 5,959,751 | A | 9/1999 | Darbee |
| 5,963,128 | A | 10/1999 | McClelland |
| 5,965,808 | A | 10/1999 | Normann et al. |
| 6,002,450 | A | 12/1999 | Darbee |
| 6,005,486 | A | 12/1999 | Fridley |
| 6,011,463 | A | 1/2000 | Cormier, Sr. |
| 6,014,092 | A | 1/2000 | Darbee |
| 6,018,993 | A | 2/2000 | Normann et al. |
| 6,021,319 | A | 2/2000 | Tigwell |
| 6,034,597 | A | 3/2000 | Normann et al. |
| 6,078,270 | A | 6/2000 | Shim |
| 6,087,930 | A | 7/2000 | Kulka et al. |
| 6,112,165 | A | 8/2000 | Uhl et al. |
| 6,124,786 | A | 9/2000 | Normann et al. |
| 6,141,792 | A * | 10/2000 | Acker et al. .................. 717/116 |
| 6,154,658 | A | 11/2000 | Casi |
| 6,155,119 | A | 12/2000 | Normann et al. |
| 6,169,480 | B1 | 1/2001 | Uhl et al. |
| 6,169,907 | B1 | 1/2001 | Chang et al. |
| 6,181,241 | B1 | 1/2001 | Normann et al. |
| 6,192,747 | B1 | 2/2001 | Fennel |
| 6,194,999 | B1 | 2/2001 | Uhl et al. |
| 6,201,819 | B1 | 3/2001 | Luders |
| 6,204,758 | B1 | 3/2001 | Wacker et al. |
| 6,208,341 | B1 | 3/2001 | van Ee et al. |
| 6,218,936 | B1 | 4/2001 | Imao |
| 6,259,361 | B1 | 7/2001 | Robillard et al. |
| 6,271,748 | B1 | 8/2001 | Derbyshire et al. |
| 6,275,148 | B1 | 8/2001 | Takamura et al. |
| 6,297,731 | B1 | 10/2001 | Flick |
| 6,298,095 | B1 | 10/2001 | Kronestedt et al. |
| 6,333,698 | B1 | 12/2001 | Roddy |
| 6,362,731 | B1 | 3/2002 | Lill |
| 6,369,703 | B1 | 4/2002 | Lill |
| 6,396,408 | B2 | 5/2002 | Drummond et al. |
| 6,400,263 | B1 | 6/2002 | Kokubo |
| 6,408,232 | B1 | 6/2002 | Cannon et al. |
| 6,438,467 | B1 | 8/2002 | Pacsai |
| 6,441,728 | B1 | 8/2002 | Dixit et al. |
| 6,445,286 | B1 | 9/2002 | Kessler et al. |
| 6,446,502 | B1 | 9/2002 | Normann et al. |
| 6,453,737 | B2 | 9/2002 | Young et al. |
| 6,463,798 | B2 | 10/2002 | Niekerk et al. |
| 6,469,621 | B1 | 10/2002 | Vredevoogd et al. |
| 6,477,165 | B1 * | 11/2002 | Kosco .......................... 370/389 |
| 6,486,773 | B1 | 11/2002 | Bailie et al. |
| 6,489,888 | B1 | 12/2002 | Honeck et al. |
| 6,490,452 | B1 | 12/2002 | Boscovic et al. |
| 6,507,306 | B1 | 1/2003 | Griesau |
| 6,518,891 | B2 | 2/2003 | Tsutsui et al. |
| 6,567,032 | B1 | 5/2003 | Mullaly |
| 6,571,617 | B2 | 6/2003 | Van Niekerk et al. |
| 6,612,165 | B2 | 9/2003 | Juzswik et al. |
| 6,622,552 | B1 | 9/2003 | Delaporte |
| 6,630,885 | B2 | 10/2003 | Hardman et al. |
| 6,633,229 | B1 | 10/2003 | Normann et al. |
| 6,662,642 | B2 | 12/2003 | Breed et al. |
| 6,667,687 | B1 | 12/2003 | DeZori |
| 6,681,164 | B2 | 1/2004 | Bergerhoff et al. |
| 6,693,522 | B2 | 2/2004 | Tang et al. |
| 6,705,155 | B2 | 3/2004 | Katou |
| 6,710,708 | B2 | 3/2004 | McClelland et al. |
| 6,731,205 | B2 | 5/2004 | Schofield et al. |
| 6,737,965 | B2 | 5/2004 | Okubo |
| 6,738,697 | B2 | 5/2004 | Breed |
| 6,747,590 | B1 | 6/2004 | Weber |
| 6,750,761 | B1 | 6/2004 | Newman |
| 6,774,778 | B2 | 8/2004 | Lin |
| 6,778,380 | B2 | 8/2004 | Murray |
| 6,788,193 | B2 | 9/2004 | King et al. |
| 6,794,993 | B1 | 9/2004 | Kessler et al. |
| 6,801,872 | B2 | 10/2004 | Normann et al. |
| 6,802,213 | B1 | 10/2004 | Agrotis |
| 6,804,999 | B2 | 10/2004 | Okubo |
| 6,822,603 | B1 | 11/2004 | Crimmins et al. |
| 6,828,905 | B2 | 12/2004 | Normann et al. |
| 6,832,573 | B2 | 12/2004 | Evans et al. |
| 6,871,157 | B2 | 3/2005 | Lefaure |
| 6,879,252 | B2 | 4/2005 | DeZorzi et al. |
| 6,885,282 | B2 | 4/2005 | Desai |
| 6,885,292 | B2 | 4/2005 | Katou |
| 6,885,293 | B2 | 4/2005 | Okumura |
| 6,885,296 | B2 | 4/2005 | Hardman et al. |
| 6,888,471 | B2 | 5/2005 | Elsner et al. |
| 6,897,770 | B2 | 5/2005 | Lill |
| 6,904,796 | B2 | 6/2005 | Pacsai et al. |
| 6,906,624 | B2 | 6/2005 | McClelland et al. |
| 6,910,627 | B1 | 6/2005 | Simpson-Young et al. |
| 6,914,523 | B2 | 7/2005 | Munch et al. |
| 6,915,146 | B1 | 7/2005 | Nguyen et al. |
| 6,915,229 | B2 | 7/2005 | Taguchi et al. |
| 6,919,798 | B2 | 7/2005 | Ide |
| 6,920,785 | B2 | 7/2005 | Toyofuku |
| 6,922,140 | B2 | 7/2005 | Hernando et al. |
| 6,927,679 | B2 | 8/2005 | Taguchi et al. |
| 6,941,803 | B2 | 9/2005 | Hirohama et al. |
| 6,972,671 | B2 | 12/2005 | Normann et al. |
| 6,983,649 | B2 | 1/2006 | Katou |
| 6,996,418 | B2 | 2/2006 | Teo et al. |
| 7,002,455 | B2 | 2/2006 | Buck et al. |
| 7,010,968 | B2 | 3/2006 | Stewart et al. |
| 7,015,801 | B1 | 3/2006 | Juzswik |
| 7,017,403 | B2 | 3/2006 | Normann et al. |
| 7,034,661 | B2 | 4/2006 | Lonsdale et al. |
| 7,039,397 | B2 | 5/2006 | Chuey |
| 7,042,348 | B2 | 5/2006 | Schulze et al. |
| 7,050,794 | B2 | 5/2006 | Chuey et al. |
| 7,084,749 | B1 | 8/2006 | Honeck et al. |
| 7,084,751 | B2 | 8/2006 | Klamer |
| 7,088,226 | B2 | 8/2006 | McClelland et al. |
| 7,095,316 | B2 | 8/2006 | Kachouh et al. |
| 7,096,003 | B2 | 8/2006 | Joao et al. |
| 7,103,460 | B1 | 9/2006 | Breed |
| 7,104,438 | B2 | 9/2006 | Benedict |
| 7,113,083 | B2 | 9/2006 | Suitsu |
| 7,116,213 | B2 | 10/2006 | Thiesen et al. |
| 7,116,218 | B2 | 10/2006 | Ogawa et al. |
| 7,120,430 | B2 | 10/2006 | Christenson et al. |
| 7,137,296 | B2 | 11/2006 | Shida et al. |
| 7,148,793 | B2 | 12/2006 | Lin |
| 7,161,466 | B2 | 1/2007 | Chuey |

(56) References Cited

U.S. PATENT DOCUMENTS

| | | |
|---|---|---|
| 7,161,476 B2 | 1/2007 | Hardman et al. |
| 7,164,117 B2 | 1/2007 | Breed et al. |
| 7,173,520 B2 | 2/2007 | Desai et al. |
| 7,224,269 B2 | 5/2007 | Miller et al. |
| 7,243,535 B2 | 7/2007 | Shimura |
| 7,254,994 B2 | 8/2007 | Schulze et al. |
| 7,307,480 B2 | 12/2007 | Shiu et al. |
| 7,315,240 B2 | 1/2008 | Watabe |
| 7,318,162 B2* | 1/2008 | Rineer et al. ............... 713/193 |
| 7,369,491 B1 | 5/2008 | Beshai et al. |
| 7,380,450 B2 | 6/2008 | Durif |
| 7,414,523 B2 | 8/2008 | Li et al. |
| 7,453,350 B2 | 11/2008 | Kachouh et al. |
| 7,478,554 B2 | 1/2009 | Roth et al. |
| 7,508,762 B2 | 3/2009 | Ohtani |
| 7,512,109 B2 | 3/2009 | Trott et al. |
| 7,518,495 B2 | 4/2009 | Tang et al. |
| 7,519,011 B2 | 4/2009 | Petrus et al. |
| 7,535,841 B1 | 5/2009 | Beshai et al. |
| 7,642,904 B2 | 1/2010 | Crano |
| 7,663,502 B2 | 2/2010 | Breed |
| 7,688,192 B2 | 3/2010 | Kenny et al. |
| 7,697,497 B2 | 4/2010 | Grube et al. |
| 7,817,543 B2 | 10/2010 | Beshai et al. |
| 7,884,707 B2 | 2/2011 | Wittliff et al. |
| 7,885,603 B2 | 2/2011 | Santavicca |
| 7,895,886 B2 | 3/2011 | Tozawa et al. |
| 7,900,198 B2* | 3/2011 | Kasman ..................... 717/158 |
| 7,948,364 B2 | 5/2011 | Lin et al. |
| 8,013,725 B2 | 9/2011 | Murata et al. |
| 8,019,323 B2 | 9/2011 | Jheng et al. |
| 8,027,359 B2 | 9/2011 | Iwamura |
| 8,031,598 B2 | 10/2011 | Beshai et al. |
| 8,035,257 B2 | 10/2011 | Fornage |
| 8,049,533 B1 | 11/2011 | Lin |
| 8,082,579 B2 | 12/2011 | Shimizu et al. |
| 8,155,617 B2 | 4/2012 | Magnusson et al. |
| 8,185,093 B2 | 5/2012 | Jheng et al. |
| 8,319,378 B2 | 11/2012 | Fornage |
| 8,330,594 B2 | 12/2012 | Suzuki et al. |
| 8,332,104 B2 | 12/2012 | Greer et al. |
| 2001/0050611 A1 | 12/2001 | Achterholt |
| 2002/0030592 A1 | 3/2002 | Laitsaari et al. |
| 2002/0059825 A1 | 5/2002 | Lundqvist |
| 2002/0067285 A1 | 6/2002 | Lill |
| 2002/0075145 A1 | 6/2002 | Hardman et al. |
| 2002/0084895 A1 | 7/2002 | Dixit et al. |
| 2002/0086708 A1 | 7/2002 | Teo et al. |
| 2002/0121132 A1 | 9/2002 | Breed et al. |
| 2002/0126005 A1 | 9/2002 | Hardman et al. |
| 2002/0130803 A1 | 9/2002 | Conway et al. |
| 2002/0144134 A1 | 10/2002 | Watanabe et al. |
| 2002/0168795 A1 | 11/2002 | Schuumans |
| 2002/0186320 A1 | 12/2002 | Carlsgaard |
| 2002/0190852 A1 | 12/2002 | Lin |
| 2003/0005759 A1 | 1/2003 | Breed et al. |
| 2003/0009270 A1 | 1/2003 | Breed |
| 2003/0030553 A1 | 2/2003 | Schofield et al. |
| 2003/0050070 A1 | 3/2003 | Mashinsky et al. |
| 2003/0071723 A1 | 4/2003 | Tang et al. |
| 2003/0079537 A1 | 5/2003 | Luce |
| 2003/0080860 A1 | 5/2003 | Stewart et al. |
| 2003/0080861 A1 | 5/2003 | Okubo |
| 2003/0095553 A1 | 5/2003 | Shiomoto et al. |
| 2003/0110851 A1 | 6/2003 | Tsujita |
| 2003/0112138 A1 | 6/2003 | Marguet et al. |
| 2003/0117276 A1 | 6/2003 | Marguet et al. |
| 2003/0117277 A1 | 6/2003 | Marguet et al. |
| 2003/0131297 A1 | 7/2003 | Fischel et al. |
| 2003/0179082 A1 | 9/2003 | Ide |
| 2003/0197594 A1 | 10/2003 | Olson et al. |
| 2003/0197595 A1 | 10/2003 | Olson et al. |
| 2003/0197603 A1 | 10/2003 | Stewart et al. |
| 2003/0228879 A1 | 12/2003 | Witkowski |
| 2004/0039509 A1 | 2/2004 | Breed |
| 2004/0041698 A1 | 3/2004 | Lin |
| 2004/0061601 A1 | 4/2004 | Freakes |
| 2004/0113765 A1 | 6/2004 | Suitsu |
| 2004/0130442 A1 | 7/2004 | Breed et al. |
| 2004/0149025 A1 | 8/2004 | Toyofuku |
| 2004/0172179 A1 | 9/2004 | Miwa |
| 2004/0174246 A1 | 9/2004 | Mitchell |
| 2004/0203370 A1 | 10/2004 | Luo et al. |
| 2004/0215382 A1 | 10/2004 | Breed et al. |
| 2005/0039103 A1 | 2/2005 | Azenko et al. |
| 2005/0046584 A1 | 3/2005 | Breed |
| 2005/0075145 A1 | 4/2005 | Dvorak et al. |
| 2005/0104722 A1* | 5/2005 | Tang et al. ................. 340/445 |
| 2005/0134446 A1 | 6/2005 | Stewart et al. |
| 2005/0156722 A1 | 7/2005 | McCall et al. |
| 2005/0179530 A1 | 8/2005 | Stewart et al. |
| 2005/0192727 A1 | 9/2005 | Shostak et al. |
| 2005/0264405 A1 | 12/2005 | Ueda |
| 2006/0001535 A1 | 1/2006 | Hafele et al. |
| 2006/0006992 A1 | 1/2006 | Daiss et al. |
| 2006/0012475 A1 | 1/2006 | Froitzheim et al. |
| 2006/0017554 A1 | 1/2006 | Stewart et al. |
| 2006/0022813 A1 | 2/2006 | Schulze et al. |
| 2006/0025897 A1 | 2/2006 | Shostak et al. |
| 2006/0044125 A1 | 3/2006 | Pierbon |
| 2006/0114107 A1 | 6/2006 | Kim et al. |
| 2006/0145829 A1 | 7/2006 | Watabe |
| 2006/0148456 A1 | 7/2006 | Chuey |
| 2006/0152342 A1 | 7/2006 | Turner et al. |
| 2006/0161327 A1 | 7/2006 | Emmerich et al. |
| 2006/0187014 A1 | 8/2006 | Li et al. |
| 2006/0192661 A1 | 8/2006 | Geradiere |
| 2006/0201241 A1 | 9/2006 | Durif |
| 2006/0217850 A1 | 9/2006 | Geerlings et al. |
| 2006/0235641 A1 | 10/2006 | Fink et al. |
| 2006/0273889 A1 | 12/2006 | Schulze et al. |
| 2007/0063814 A1 | 3/2007 | Olson et al. |
| 2007/0069947 A1 | 3/2007 | Banet et al. |
| 2007/0176736 A1 | 8/2007 | Chuey et al. |
| 2007/0182531 A1 | 8/2007 | Kuchler |
| 2007/0190993 A1 | 8/2007 | Chuey et al. |
| 2007/0194898 A1 | 8/2007 | Fukumori |
| 2007/0210920 A1 | 9/2007 | Panotopoulos |
| 2007/0213951 A1 | 9/2007 | Van Eeden |
| 2007/0223484 A1 | 9/2007 | Crowle et al. |
| 2007/0247294 A1 | 10/2007 | Baader et al. |
| 2007/0279201 A1 | 12/2007 | Casey et al. |
| 2008/0001729 A1 | 1/2008 | Kyllmann et al. |
| 2008/0024287 A1 | 1/2008 | Boyle et al. |
| 2008/0037458 A1 | 2/2008 | Myszne |
| 2008/0062880 A1 | 3/2008 | Yew et al. |
| 2008/0080447 A1 | 4/2008 | Grube et al. |
| 2008/0094198 A1 | 4/2008 | Yu |
| 2008/0100430 A1 | 5/2008 | Kochie et al. |
| 2008/0141766 A1 | 6/2008 | Roth et al. |
| 2008/0143593 A1* | 6/2008 | Graziano et al. ......... 342/357.09 |
| 2008/0165816 A1 | 7/2008 | Beshai et al. |
| 2008/0173082 A1* | 7/2008 | Hettle et al. ................. 73/146.5 |
| 2008/0177441 A1 | 7/2008 | Marlett et al. |
| 2008/0205553 A1 | 8/2008 | Costello et al. |
| 2008/0211672 A1 | 9/2008 | Pei |
| 2008/0240283 A1 | 10/2008 | Iwamura |
| 2008/0256260 A1 | 10/2008 | Magnusson et al. |
| 2008/0282965 A1 | 11/2008 | Crano |
| 2008/0285507 A1 | 11/2008 | Mukherjee et al. |
| 2008/0320243 A1 | 12/2008 | Mitsuzuka et al. |
| 2009/0033478 A1* | 2/2009 | Deniau et al. ................. 340/442 |
| 2009/0045930 A1 | 2/2009 | Fu |
| 2009/0067854 A1 | 3/2009 | Yokogawa et al. |
| 2009/0070863 A1 | 3/2009 | Shimizu et al. |
| 2009/0108992 A1* | 4/2009 | Shafer .......................... 340/10.1 |
| 2009/0179747 A1 | 7/2009 | Lin et al. |
| 2009/0184815 A1 | 7/2009 | Suzuki et al. |
| 2009/0207859 A1 | 8/2009 | Beshai et al. |
| 2009/0231114 A1* | 9/2009 | Yu ................................ 340/447 |
| 2009/0267751 A1 | 10/2009 | Kaleal et al. |

(56) References Cited

U.S. PATENT DOCUMENTS

| | | |
|---|---|---|
| 2009/0291710 A1 | 11/2009 | Jheng et al. |
| 2009/0310477 A1 | 12/2009 | Lee et al. |
| 2010/0308987 A1 | 12/2010 | Haas et al. |
| 2011/0140876 A1 | 6/2011 | Deniau |
| 2011/0181321 A1 | 7/2011 | Matsudera |
| 2011/0211414 A1 | 9/2011 | Musha |
| 2011/0250860 A1 | 10/2011 | Lin |
| 2011/0267024 A1 | 11/2011 | Halberstadt |
| 2011/0294548 A1 | 12/2011 | Jheng et al. |
| 2012/0001745 A1 | 1/2012 | Li |
| 2012/0117788 A1 | 5/2012 | Deniau |
| 2012/0119895 A1 | 5/2012 | Deniau |
| 2012/0147184 A1 | 6/2012 | Siann et al. |
| 2012/0185110 A1 | 7/2012 | Deniau et al. |
| 2012/0274461 A1 | 11/2012 | Colombo et al. |

FOREIGN PATENT DOCUMENTS

| | | |
|---|---|---|
| DE | 19720123 | 7/1998 |
| DE | 19924830 | 11/2000 |
| DE | 10014076 | 10/2001 |
| DE | 10040238 | 3/2002 |
| DE | 10247761 | 6/2003 |
| DE | 10217239 | 7/2003 |
| DE | 10207014 | 8/2003 |
| DE | 10307265 | 10/2003 |
| DE | 69529456 | 11/2003 |
| DE | 10247149 | 4/2004 |
| DE | 60108973 | 7/2005 |
| DE | 60202342 | 12/2005 |
| DE | 60023387 | 7/2006 |
| DE | 102005004825 | 8/2006 |
| DE | 102005059009 | 6/2007 |
| DE | 102007039599 | 3/2008 |
| DE | 102008008237 | 8/2009 |
| DE | 102008033051 | 2/2010 |
| EP | 793579 | 9/1997 |
| EP | 1026016 | 8/2000 |
| EP | 1291230 | 3/2003 |
| EP | 1428694 | 6/2004 |
| EP | 1494877 | 1/2005 |
| EP | 1547827 | 6/2005 |
| EP | 1562162 | 8/2005 |
| EP | 1026015 | 5/2006 |
| EP | 1352763 | 4/2008 |
| EP | 1340629 | 6/2008 |
| GB | 2387032 | 10/2003 |
| GB | 2420415 | 5/2006 |
| JP | 62003537 | 1/1987 |
| JP | 63090407 | 4/1988 |
| JP | 05107134 | 4/1993 |
| JP | 8244423 | 9/1996 |
| JP | 2000142044 | 5/2000 |
| JP | 2000238515 | 9/2000 |
| JP | 2001080321 | 3/2001 |
| JP | 2003025817 | 1/2003 |
| JP | 2004-145474 | 5/2004 |
| JP | 2005289116 | 10/2005 |
| JP | 2006015832 | 1/2006 |
| JP | 2007200081 | 8/2007 |
| JP | 2007283816 | 11/2007 |
| JP | 2008137585 | 6/2008 |
| KR | 2003068216 | 8/2003 |
| RU | 2238190 | 10/2004 |
| WO | 94/20317 | 9/1994 |
| WO | 9422693 | 10/1994 |
| WO | 99/08887 | 2/1999 |
| WO | 0072463 | 11/2000 |
| WO | 0145967 | 6/2001 |
| WO | 02/94588 | 11/2002 |
| WO | 03016079 | 2/2003 |
| WO | 2004038674 | 5/2004 |
| WO | 2005085651 | 9/2005 |
| WO | 2005116603 | 12/2005 |
| WO | 2008/103973 | 8/2008 |
| WO | 2008-106387 | 9/2008 |
| WO | 2008107430 | 9/2008 |
| WO | 2009006518 A1 | 1/2009 |

OTHER PUBLICATIONS

Jeff Burgess, "Tire Pressure Monitoring System Reference Design", Tire Pressure Monitor System Demo, AN1951/D, Rev 1, May 2003, Motorola, Inc., 2003 (24 pgs.).

"Motorola's MPXY8000 Series Tire Pressure Monitoring Sensors", Motorola Sensor Products Division Transportation & Standard Products Group, Motorola, Inc., May 2003 (22 pgs.).

Alfred Pohl et al. "Wirelessly Interrogable Surface Acoustic Wave Sensors for Vehicular Applications", IEEE Transactions on Instrumentation and Measurement vol. 46, No. 4, IEEE, Aug. 1997 (8 pgs..).

"Tire pressure Warning System Using Direct Measurement Method (SOARER)" G0880A ISSN: 0388-3841, vol. 51 No. 7, pp. 174-179, Toyota Motor Corporation, May 2, 2002 (6 pgs.).

"Sony Remote Commander Operating Instructions RM-V701/V801", 1998, Sony Corporation.

"Philips Magnavox 4 Function with Back Lighted Keypad Universal Remote" Operating Instructions, printed Oct. 2012, Philips Electronics North America Corporation.

"RadioShack 8-In-One Touch Screen Remote Control", Owner's Manual, 2001, RadioShack Corporation.

Kais Mnif, "A Smart Tire Pressure Monitoring System", Sensors Magazine, Nov. 1, 2001.

International Search Report and Written Opinion dated Sep. 28, 2012, from corresponding International Patent Application No. PCT/US2011/047108.

USPTO Translation JP2003025817A, translated from Japanese by Schreiber Translations, Inc., Feb. 2013.

International Search Report and Written Opinion mailed on Oct. 15, 2008, for Application No. PCT/US2008/069006.

International Preliminary Report on Patentability mailed on Jan. 14, 2010, for Application No. PCT/US2008/069006.

Chinese Office Action mailed on Apr. 19, 2011, for Chinese Application 200880023390.7 (Corresponding to PCT/US2008/069006).

Chinese Office Action (first) mailed on Feb. 16, 2012, for Chinese Application 200880023390.7 (Corresponding to PCT/US2008/069006).

Chinese Office Action (third) mailed on Oct. 10, 2012, for Chinese Application 200880023390.7 (Corresponding to PCT/US2008/069006).

Japanese Office Action mailed on Jun. 7, 2012, for JP Application 2010-515252 (Corresponding to PCT/US2008/069006).

International Search Report and Written Opinion dated Sep. 28, 2012, from corresponding International Patent Application No. PCT/US2011/047104.

Germany Office Action dated Nov. 19, 2012.

Germany Office Action dated Sep. 17, 2007.

Preliminary Invalidity Contentions of Defendant Continental Automotive Systems US, Inc.; dated Jan. 17, 2012, , In the United States District Court for Western District of Virginia Lynchburg Division, Civil Action No. 6:11-CV-00014-NKM.

Amended Invalidity Contentions of Defendant Continental Automotive Systems US, Inc.; dated Jun. 18, 2012, In the United States District Court for Eastern District of Michigan Southern Division, Civil Action No. 2:12-cv-10715-SJM-MJH.

Plaintiffs' Initial Infringement Contentions; dated Dec. 15, 2011, In the United States District Court for Western District of Virginia Lynchburg Division, Civil Action No. 6:11-CV-00014-NKM-RSB.

Joint Claim Construction and Prehearing Statement, dated Jun. 11, 2012, from co-pending litigation: *Schrader-Bridgeport Int'l, Inc.* v. *Continental Automotive Sys, US, Inc.,* case docket No. 2:12-cv-10715-SJM-MJH, (filed Feb. 16, 2012, E.D. Mich.).

(56) References Cited

OTHER PUBLICATIONS

Plaintiffs' Opening Claim Construction Brief, dated Jun. 26, 2012, from co-pending litigation: *Schrader-Bridgeport Int'l Inc. v. Continental Automotive Sys. US, Inc.,* case docket No. 2:12-cv-10715-SJM-MJH, (filed Feb. 16, 2012, E.D. Mich.).

International Search Report and Written Opinion dated Sep. 28, 2012, from corresponding International Patent Application No. PCT/US2011/047112.

Jeff Burgess "TPMS Demonstration Kit", AN1943/D, Rev 1, Apr. 2002, Motorola, Inc., 2002 (16 pgs.).

\* cited by examiner

TIRE PRESSURE MONITORING APPARATUS AND METHOD

CROSS REFERENCES TO RELATED APPLICATIONS

"Protocol Arrangement in a Tire Pressure Monitoring System" having Ser. No. 13/206,314;

"Apparatus and Method for Activating a Localization Process for a Tire Pressure Monitor" having Ser. No. 13/206,336; and "Protocol Misinterpretation Avoidance Apparatus and Method for a Tire Pressure Monitoring System" having Ser. No. 13/206,358 all of which being filed on the same date as the present application and all of which having their contents incorporated herein by reference in their entireties.

FIELD OF THE INVENTION

The field of the invention relates to tire pressure monitoring devices that utilize potentially different transmission protocols.

BACKGROUND

The pressure and other operating parameters of tires are important concerns when operating a vehicle. Not only can incorrect tire pressure (or the incorrect setting of some other tire parameter) lead to inefficient vehicle operation (e.g., the waste of fuel and other problems leading to higher operating costs), but too low a tire pressure (or an inadequate value for some other tire parameter) can lead to safety problems such as accidents. It is difficult and sometimes time-consuming for users to manually measure tire pressure (or other parameters) with a pressure gauge (or other instruments). Consequently, automatic tire pressure monitoring systems have been devised and these systems free the user from manually making tire measurements.

An automatic tire pressure monitoring device typically mounts to a wheel within the tire and wirelessly transmits information indicative of conditions within the tire. The transmissions and the order of information are typically defined by a protocol corresponding to a receiver within the vehicle. Once the receiver receives the information, the information can be processed and presented to a user. For instance, a user can be warned when the pressure in their tires is too high or too low and thus avoid safety problems. Each automobile manufacturer typically has a unique, preferred, and pre-defined protocol to meet application specific needs and applications. Consequently, receivers using one manufacturers' protocol are not responsive to transmitters operating according to other manufacturers' protocols.

The use of different and unique protocols to operate tire pressure monitoring sensors, however, also complicates maintenance and service operations. For example, a special programming device is needed to configure the tire pressure monitor and a receiver must be specifically configured to receive the information. System upgrades are also more difficult to make since the programming device must use the correct protocol.

Figure 1:
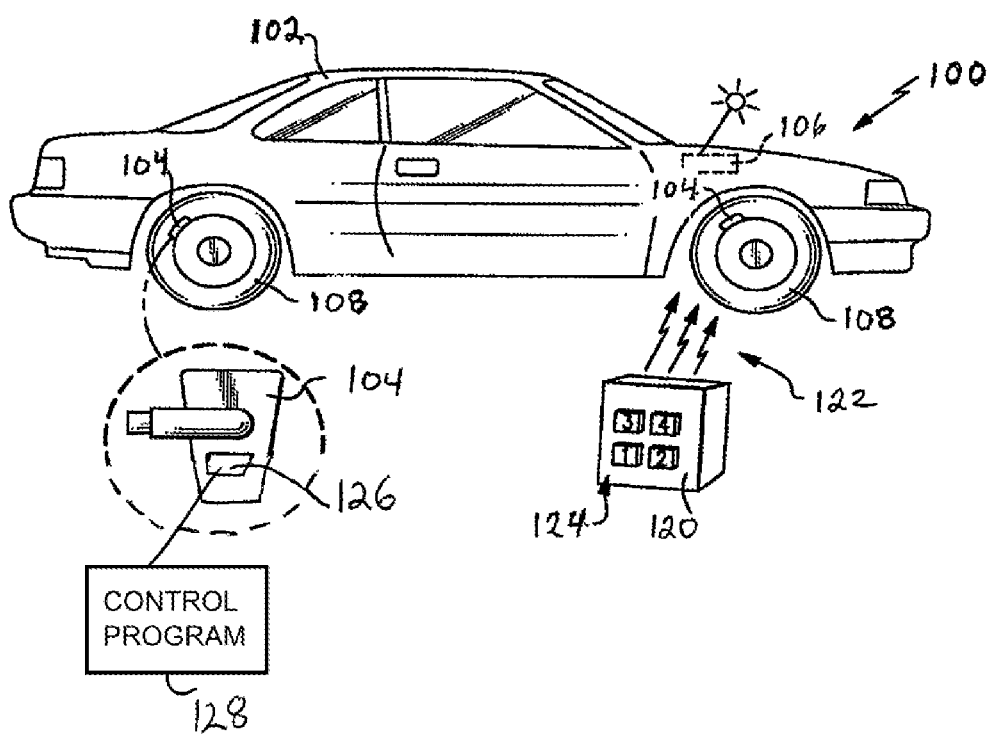
FIG. 1 comprises a block diagram of a tire pressure monitoring system according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where, in some examples and under some conditions, tire pressure information is communicated to a receiver (e.g., a controller in a vehicle) according to one or more protocols (e.g., manufacturer protocols) and the receiver is programmed to recognize the information transmitted in one or more of these formats. The tire pressure information is transmitted not using manufacturing codes (or codes of any sort). For instance, a control program is used to transmit tire pressure information (and possibly other types of information) according to one or more manufacturers' protocols. In one aspect, the system is not universal in the sense that transmissions are not made according to each and every possible manufacturer protocol, but only according to selected ones of all possible manufacturers' formats. The receiver recognizes protocols for which it is programmed to receive, while ignoring others.

In many of these embodiments, tire pressure information is sensed. The sensed tire pressure information is stored in a transmission buffer. A control program is executed to transmit the tire pressure information from the transmission buffer to an external receiver device (e.g., such as a control unit in a vehicle) according to each of a plurality of communications protocols (e.g., data formats, transmission approaches, baud rates, transmission frequencies to mention a few examples of items a protocol may specify) incorporated into the control program and not according to a manufacturers' code.

In other aspects, the external receiver device (e.g., controller in a vehicle) is configured to operate according to a selected one of the plurality of communication protocols. At the external receiver device, the tire pressure information transmitted according to each of the plurality of communication protocols is received. The receiver recognizes the tire pressure information transmitted according to the selected one of the plurality of communication protocols and ignores the tire pressure information transmitted according to others of the plurality of communication protocols.

In other aspects, the external receiver device comprises a processor. In still other aspects, the tire pressure information includes a measured pressure of a tire. Other types of information (e.g., tread wear, temperature) may also be obtained.

The control program may be compiled and/or assembled prior to its execution. The transmission of information according to each of the protocols may be in predetermined frame or block having a pre-defined format. Thus, separate frames or blocks can be used to transmit tire pressure information according to different protocols.

Each of the frames or blocks may be transmitted sequentially in one or more bursts. As used herein, the term "burst" refers to a sequential transmission of frames, some or all of the frames being information frames and some others possible being null frames (that separate information frames). Alternatively, all frames may be information frames and no null frames are used. As mentioned, a null frame may be used to separate each of the frames or blocks in the burst. Further, different bursts (i.e., having different frames and/or frames arranged differently) may be used in different circumstances (e.g., a first burst when the vehicle is moving and a second burst when the vehicle is stationary).

In others of these embodiments, an apparatus for sensing tire pressure information includes a sensing device, a transmission buffer, a memory, a transmitter, and a processor. The sensing device is configured to sense tire pressure information of a tire. The transmission buffer is communicatively coupled to the sensing device and is configured to store the sensed tire pressure information. The transmitter is coupled to the transmission buffer and is configured to transmit signals. The processor is communicatively coupled to the sensing device, the transmitter, the memory, and the transmission buffer. The processor is configured to execute a control program stored in a memory and execution of the control program is effective to transmit the tire pressure information from the transmission buffer to an external receiver (e.g., a control device in the vehicle) via the transmitter according to each of a plurality of communications protocols incorporated into the control program and not according to a manufacturers' code.

In other aspects, a receiver is configured to receive the tire pressure information according to each of the plurality of communication protocols that is transmitted by the transmitter. The receiver is further configured to recognize the tire pressure information transmitted according to a selected one (or ones) of the plurality of communication protocols and ignore the tire pressure information transmitted according to non-selected ones of the plurality of communication protocols.

Thus, approaches are provided to transmit sensed tire pressure information by executing a control program and not by using any codes that identify a protocol or format. As used herein, the term code means a separate, portable entity (e.g., a manufacturers' code such as a UPC code). Since manufacturers' codes are not used, there is no need to engage a special programming device to select these codes. The tire pressure monitoring devices described herein can be retrofitted into existing tires without the need to select manufacturers' codes or engage in a lengthy and expensive programming process. In so doing, the cost of these devices is significantly reduced and user satisfaction is increased.

Referring to FIG. 1, a tire pressure monitoring system 100 is shown assembled within a vehicle 102. The system 100 includes a receiver 106 that receives communications from tire pressure monitoring devices 104 assembled within each of the vehicle's tires 108. The receiver 106 may be any communication device configured to receive any type of transmitted communication but tuned to only recognize some of these communications. In one example, these communications are radio frequency (RF) communications, but other types of communications are also possible.

Although the device 104 is described as a tire pressure monitoring device herein, it will be appreciated that this device can gather and transmit other types of information related to the tire in addition to or in place of tire pressure information. For example, the information can include temperature information or information related to the wear of the treads of the tire. Appropriate sensors or sensing devices may be used to obtain this information. Other examples of information may also be gathered by the tire pressure monitoring device 104.

Each of the tire pressure monitoring devices 104 are assembled within the tires 108 of the vehicle 102 and, as mentioned, communicate information indicative of conditions within the tires 108 to the receiver 106. These conditions include temperature, pressure, and/or any other desired information that aids in the evaluation of tire conditions. Other examples of conditions may also be sensed.

The system 100 includes the tire pressure monitoring devices 104 that in this example includes a memory device 126. The memory device 126 is utilized for the storage of a control program 128. The control program 128, once compiled and executed, transmits sensed information (e.g., tire pressure information) according to one or more protocols (or formats) that govern operation and communication between the tire pressure monitoring device 104 and the receiver 106. Examples of communication protocols that may be used include protocols that specify the frequency and timing of transmissions from the tire pressure monitoring device 104 to the receiver 106 or the format of transmission (such as what constitutes a "1" or a "0," modulation type, error detection and/or correction content, synchronization pattern, and so forth to name but a few examples in these regards). Tire pressure monitoring information may be transmitted according to the protocols sequentially (e.g., using the same antenna) or at the same time (e.g., using different antennas). No separate manufacturers' codes are used in making the transmissions. Once the control program is compiled, the protocols that have been selected cannot be changed without changing (e.g., editing, compiling, and installing anew) the control program 128. In one aspect, is compiled and stored in the memory 126 during manufacturing.

In one aspect, the control program 128 may be executed continuously whenever the vehicle is moving. The control program 128 may also be executed when the vehicle is not moving, but only when the sensor is activated externally (i.e., via LF or grounding of a pin on the ASIC during manufacturing). At other times, it may not be executed. However, learning the identities of the devices 104 and/or determining where each device is located ("localization", e.g., front left, front right, and so forth) may be accomplished by using an activation device 120. The activation device 120 emits a wireless signal 122 (e.g., an LF signal) that is received by a corresponding one of the tire pressure monitoring devices 104. Receipt of the wireless signal 122 causes the device 104 to transmit identity information and also indicate to the receiver 106 that the device 104 has received an LF signal and that the localization process can occur. When the vehicle is moving, LF transmitters (e.g., antennas) may transmit LF signals in place of the device 120. When moving, the RF signals are periodically being transmitted and when the device 104 finds an LF signal, it so indicates to the receiver 106 (e.g., by flipping a bit). Once this indication is received, localization can be completed (e.g., this process may occur for a predetermined amount of time to ensure that the device 104 is correctly localized). Once localization is complete, tire pressure information can be associated with a known tire. It will be appreciated that in other examples, the control program may itself be activated by the LF signals.

The activation device 120 includes a series of selectable buttons 124 (or other types of actuators) that are actuated by a user to indicate that they wish to activate the tire pressure monitoring device. Although the example device 120 is shown with buttons, other display and selection configurations, such as touch screens, switches or some other selection interface may be used as will be appreciated by those skilled in the art. Accordingly, installation of the multi applications tire pressure monitoring devices 104 optionally includes the initial step of physically activating the tire pressure monitoring devices 104 within each of the corresponding tires 108 or activate a localization process that allows tire pressure data to be associated with particular tires.

If an activation device is used, the activation device 120 is placed proximate to each of the tire pressure monitoring devices 104 to send a signal 122. In one example, the signal 122 is a low frequency transmission received by the proximate tire pressure monitoring device 104.

The devices 104 operate with the receiver 106 in the vehicle and the receiver 106 typically has a display (or some sort of user interface) that is configured to alert the driver when the tire pressure falls below a predetermined threshold value. As mentioned, once physically installed in the tire, the devices 104 are first "learned" by the control unit. During this process, the receiver 106 determines the particular identifiers and during or after learning, a localization process may be executed in which each of the devices 104 is associated with a particular tire.

During normal operation (after the sensors are learned and localized and the vehicle is moving), the device 104 senses the tire pressure and sends a radio frequency (RF) signal to the receiver 106 indicating the tire pressure. The receiver 106 can then determine if a pressure problem exists. If a problem exists, the user can be alerted so that appropriate action can be taken. As mentioned, this is all accomplished by use of a control program that is compiled, translated, and/or assembled before it is executed. In one aspect, once compiled the structure of the control program (e.g., the protocols selected) can not be changed. Also, nothing external to the device can be input into this control program to change the structure of the control program once the control program (and the protocols specified in the control program) is compiled.

Figure 2:
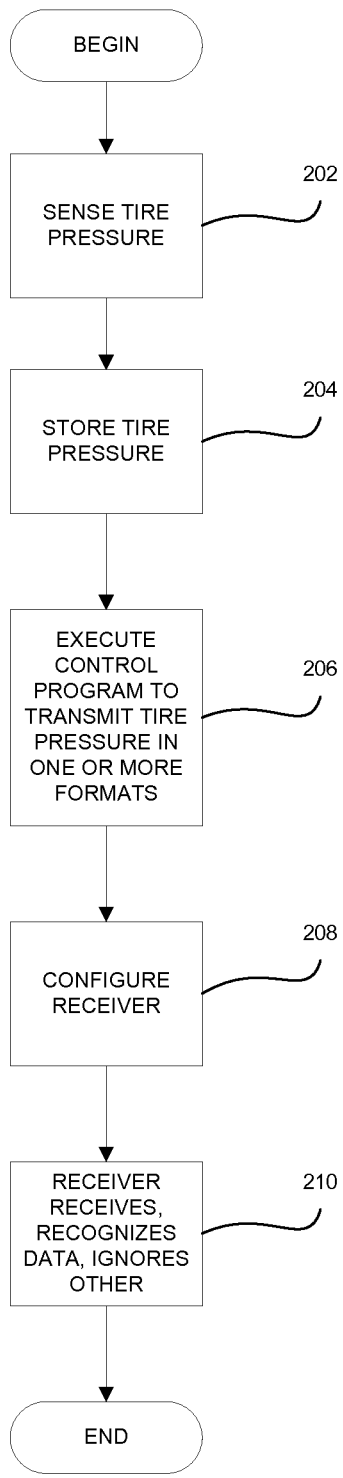
FIG. 2 comprises a flowchart showing one example of an approach for monitoring pressure and/or other parameters of a tire according to various embodiments of the present invention.

Referring now to FIG. 2, one example of an approach for transmitting sensed tire pressure information is described. At step 202, the tire pressure information is sensed. This can be accomplished by any tire pressure sensing mechanism as known to those skilled in the art.

At step 204, the sensed tire pressure information is stored in a transmission buffer. The transmission buffer may be part of a memory, in one example.

At step 206, a control program is executed to transmit the tire pressure information from the transmission buffer to an external receiver device according to each of a plurality of communications formats incorporated into the control program and not according to a manufacturers' code. The control program may be stored in the same memory as the transmission buffer or may be stored in a separate memory unit. The control program may transmit information according to all possible protocols (i.e., it is universal) or a subset of all available protocols.

The control program may be compiled and/or assembled prior to its execution. The transmission of information according to each of the protocols may be in predetermined frame or block having a pre-defined format. Thus, separate frames or blocks are used to transmit tire pressure information for different protocols. Each of the frames or blocks may be transmitted sequentially in a burst. A null space may be used to separate each of the frames or blocks in the burst.

At step 208, the external receiver device may be configured to operate according to a selected one of the plurality of communication protocols. At the external receiver device (that is configured to operate according to a selected one of the plurality of communication protocols) receives the tire pressure information transmitted. At step 210, the receiver recognizes the tire pressure information transmitted according to the selected one of the plurality of communication protocols and ignores the tire pressure information transmitted according to others of the plurality of communication protocols. By "ignore" and as used herein, it means that the receiver receives a communication and discards the communication when the receiver determines the communication is not of a certain protocol. In one example, the receiver looks for a particular byte pattern and when it does not see the particular byte pattern, it discontinues analyzing the remainder of the frame.

Figure 3:
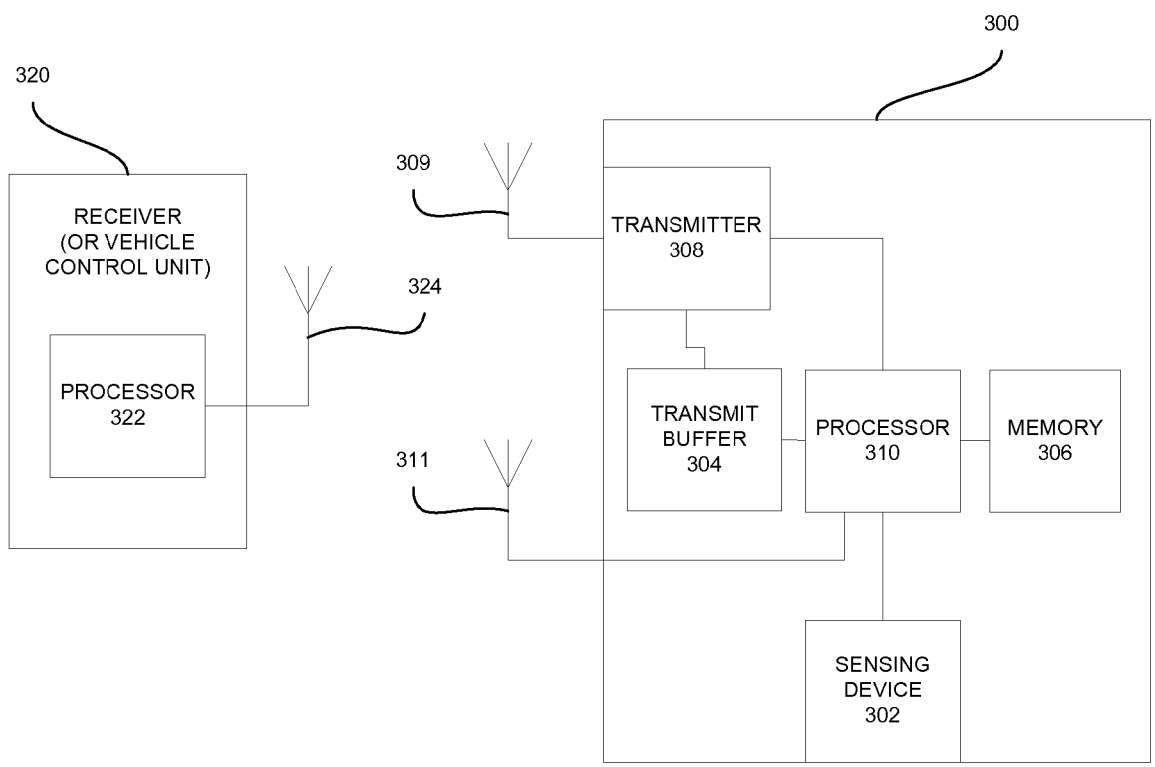
FIG. 3 comprises a block diagram of an example of a tire pressure monitoring system according to various embodiments of the present invention.

Referring now to FIG. 3, an apparatus 300 for sensing tire pressure information is described. The apparatus 300 includes a sensor 302, a transmission buffer 304, a memory 306, a transmitter 308, and a processor 310. One or more antennas 309 transmit RF signals with the tire pressure information (e.g., in blocks or frames, the blocks or frames serially transmitted in bursts, each block having a predetermined format). One or more antennas 311 receive other communications (e.g., LF communications) that effectively and eventually activate the localization process to identify the localization of the apparatus 300.

The sensor 302 that is configured to sense tire pressure information of a tire. The sensor 302 is any mechanical or other type of sensing arrangement that senses the pressure of the tire as known to those skilled in the art.

The transmission buffer 304 is communicatively coupled to the sensing device and is configured to store the sensed tire pressure information. The transmission buffer 304 may be part of the memory 306 or separate from the memory 306. The memory 306 may be any type of memory storage device.

The transmitter 308 is coupled to the transmission buffer 304 and is configured to transmit signals. The transmitter 308 may have one or more antennas 309 to transmit the signals. As mentioned, one or more antennas 311 receive other communications (e.g., low frequency (LF) communications) that eventually activate the localization process that determines the location of the apparatus 300. These antennas may be coupled to the processor 310, which determines whether the signals meet criteria that are required to send a signal back to the receiver to activate the localization process that locates apparatus 300 and thereby begin transmitting the tire pressure information.

The processor 310 is communicatively coupled to the sensor 302, the transmitter 308, the transmission buffer 304, and the memory 306. The processor 310 is configured to execute a control program stored in a memory and execution of the control program is effective to transmit the tire pressure information from the transmission buffer 304 to an external receiver via the transmitter 308 according to each of a plurality of communications formats incorporated into the control program and not according to a manufacturers' code.

In other aspects, a receiver 320 is configured to receive the tire pressure information transmitted according to each of the plurality of communication protocols that is transmitted by the transmitter 308 at antenna 324 and communicate the information to processor 322 where the information can be processed. The receiver 320 is further configured to recognize the tire pressure information transmitted according to a selected one of the plurality of communication protocols and ignore the tire pressure information transmitted according to non-selected ones of the plurality of communication protocols.

Figure 4:
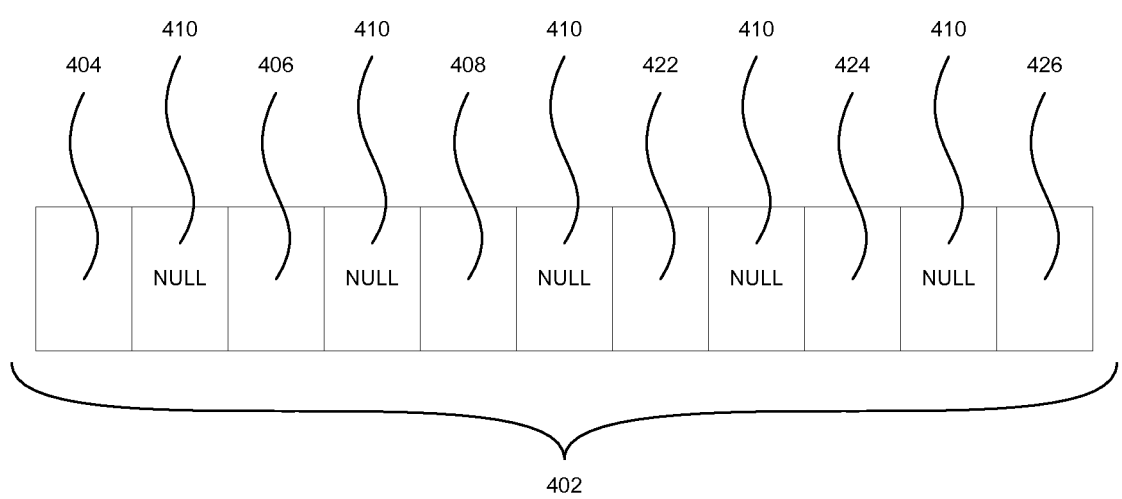
FIG. 4 comprises a block diagram of transmission burst formats according to various embodiments of the present invention.

Referring now to FIG. 4, one example of RF transmissions is described. In this example, a burst 402 includes blocks (or frames) 404, 406, 408, 422, 424, and 426. Null frames 410 are inserted between the frames, 406, 408, 410, 422, 424, and 426.

Each of the blocks or frames 404, 406, 408, 422, 424, and 426 includes tire pressure information. This information may be in the same or different formats. In one example, all frames 404, 406, 408, 422, 424, and 426 include the information according to the protocol of a first manufacturer. In another example, frame 404 is in the protocol of a first manufacturer, frame 406 is according to the protocol of a second manufacturer, frame 408 is in the protocol of the first manufacturer, frame 422 is in the protocol of a third manufacturer, frame 424 is according to the protocol of a fourth manufacturer, and frame 426 is according to the protocol of a fifth manufacturer. In still another example, the frames are in the format of completely different manufacturers. In other aspects, a manufacturer itself may have different formats. For instance, a first manufacturer may have a first format and a second format. Other burst configurations are possible.

It will be appreciated that the frames and their format, baud rate, transmission scheme, bit pattern, or other characteristic may vary among manufacturers. For example, the format may include fields with certain meanings and content.

In one aspect, once the burst 402 is sent, it is repeatedly transmitted. The repetition is immediate and each new burst includes newly updated information transmitted in each frame of the burst.

In one aspect, the burst pattern cannot be changed by the user without the control program being entirely re-programmed. That is, a programming tool cannot be used to change the control program to transmit frames for additional/different manufacturers and cannot be used to select frames formatted according to certain protocols to transmit.

Figure 5:
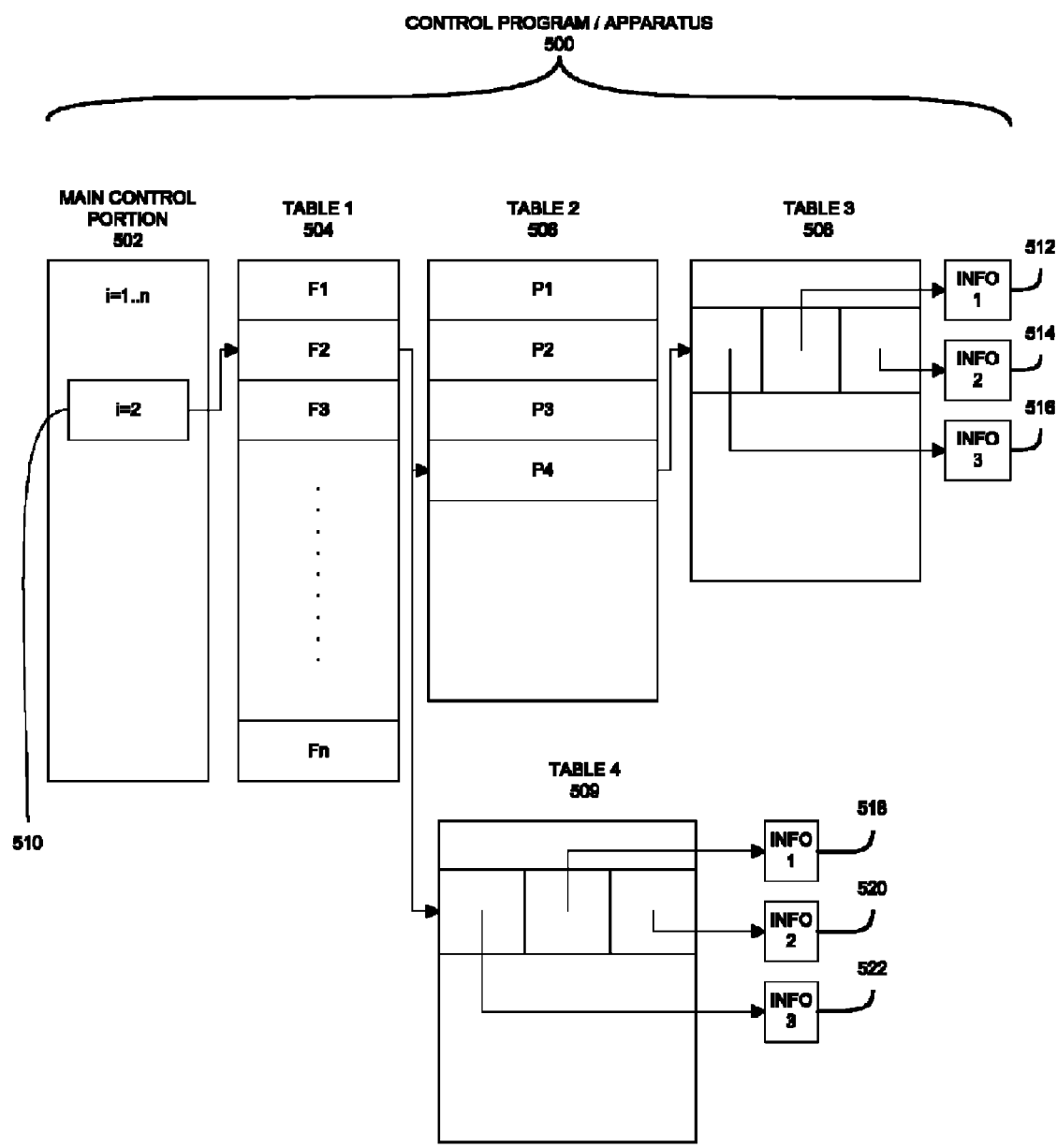
FIG. 5 comprises a block diagram of a control program/apparatus for transmitting tire pressure information according to various embodiments of the present invention.

Referring now to FIG. 5, one example of an architecture of a control program or apparatus 500 is described. The control program or apparatus 500 includes a main control portion 502, a first table 504, a second table 506, a third table 508, and a fourth table 509. It will be appreciated that this is one example of an architecture of a control program apparatus and that other examples are possible. Further, it will be appreciated that this can be implemented in computer software (executed on a general purpose microprocessor in one example) and/or computer hardware.

A first integer index value (i) 510 is incremented by the main control portion 502 of the control program/apparatus 500. This first index value 510 is used to access a first look-up table 504 in the control program. Each indexed entry of the first look-up table 504 is a frame type (of a particular manufacturer) (F1, F2, F3 . . . Fn where these expressions include memory addresses or pointers). Manufacturers can have associated multiple frame types.

The frame type memory addresses or pointers (F1, F2, F3 . . . Fn) are used by the control program/apparatus 500 to access the second look-up table 506 in the control program/apparatus 500. Alternatively, they may be used to access the fourth table 509. The second look-up table 506 has entries (P1, P2, P3, P4 . . . Pn where again these expressions include memory addresses or pointers) that correspond to protocol types. The fourth look up table 509 has addresses/pointers that point to information 518, 520, and 522.

The protocol type memory addresses or pointers (P1, P2, P3, P4 . . . Pn) obtained from the second look-up table 506 are next used by the control program/apparatus 500 to access the third look-up table 508. The third look-up table 508 has memory addresses or pointers to various pieces of information 512, 514, and 516 that are used to build a frame in the transmission buffer with the frame being of a particular frame type as accords the corresponding protocol type. The information 512, 514, and 516 may include format information, bit positioning information to mention two examples and may be stored in further tables or other data structures.

The control program uses the frame type from table 504 and/or the protocol table 506 to access data depending upon the type of data to be accessed. In one aspect, the first table 504 is used to access the fourth table 509 (and the data 518, 520, 522) by the control program when the data is not common between frame types. When the data is common between frame types, then the control program uses the first table 504, second table 506, and third table 508 to access the data 512, 514, and 516. In other examples, only the first table 504, second table 506, and third table 508 are used.

It should be understood that any of the devices described herein (e.g., the programming or activation devices, the tire pressure monitoring devices, the receivers, the transmitters, the sensors, the presentation devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or non-volatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of operating a tire pressure monitoring system comprising:
    sensing tire pressure information;
    storing the sensed tire pressure information in a transmission buffer;
    executing a control program; and
    transmitting a burst having a burst pattern from the transmission buffer to an external receiver device, the burst comprising the tire pressure information, the transmitting occurring according to a plurality of communications formats for a plurality of automobile manufacturers, the burst pattern incorporated into the control program and not associated with a manufacturers' code; and
    wherein compilations of the control program that are associated with modifications to the burst pattern are made only by a manufacturer such that tampering with the burst pattern by unauthorized users is discouraged.

2. The method of claim 1 further comprising:
    configuring the external receiver device to operate according to a selected one of the plurality of communication formats;
    at the external receiver device:
    receiving the tire pressure information transmitted according to the plurality of communication formats;
    recognizing the tire pressure information transmitted according to the selected one of the plurality of communication protocols and ignoring the tire pressure information transmitted according to others of the plurality of communication formats.

3. The method of claim 1 wherein the external receiver device comprises a processor.

4. The method of claim 1 wherein the tire pressure information comprises a measured pressure of a tire.

5. The method of claim 1 further comprising compiling the control program prior to the executing.

6. The method of claim 1 wherein each of the formats is transmitted in a predetermined block having a pre-defined format.

7. The method of claim 6 wherein the each of the blocks are transmitted sequentially in the burst.

8. The method of claim 7 wherein a null space separates each of the blocks in the burst.

9. An apparatus for sensing tire pressure information, the apparatus comprising:
    a sensing device that is configured to sense tire pressure information of a tire;
    a transmission buffer communicatively coupled to the sensing device, the buffer configured to store the sensed tire pressure information;
    a transmitter coupled to the transmission buffer;
    a memory, the memory storing a control program;
    a processor, the processor communicatively coupled to the sensing device, the transmitter, the memory, and the transmission buffer, the processor configured to execute the control program stored in the memory, execution of the control program effective to transmit a burst having a burst pattern from the transmission buffer to an external receiver via the transmitter, the burst comprising the tire pressure information according to a plurality of communications formats for a plurality of automobile manufacturers, the burst pattern being incorporated into the control program and not associated with a manufacturers code, and wherein compilations of the control program that are associated with modifications to the burst pattern are made only by a manufacturer such that unauthorized tampering with the burst pattern is discouraged.

10. The apparatus of claim 9 wherein the tire pressure information comprises a measured pressure of a tire.

11. The apparatus of claim 9 wherein the control program is compiled prior to execution.

12. The apparatus of claim 9 wherein each of the formats is transmitted in a predetermined block having a pre-defined format.

13. The apparatus of claim 12 wherein the each of the blocks are transmitted sequentially in the burst.

14. The apparatus of claim 13 wherein a null space separates each of the blocks in the burst.

15. The apparatus of claim 9 further comprising:
    a receiver that is configured to receive the tire pressure information transmitted according to the plurality of communication formats that is transmitted by the transmitter, the receiver further configured to recognize the tire pressure information transmitted according to a selected one of the plurality of communication formats and ignore the tire pressure information transmitted according to non-selected ones of the plurality of communication formats.

16. A computer usable non-transitory medium having a computer readable program code embodied therein, said computer readable program code adapted to be executed to implement a method of operating a tire pressure monitoring system, the method comprising:
    sensing tire pressure information;
    storing the sensed tire pressure information in a transmission buffer;
    executing a control program; and
    transmitting a burst having a burst pattern from the transmission buffer to an external receiver device, the burst comprising the tire pressure information according to a plurality of communications formats for a plurality of automobile manufacturers, the burst pattern being incorporated into the control program and not associated with a manufacturers' code, and wherein compilations of the control program that are associated with modifications to the burst pattern are made only by a manufacturer such that unauthorized tampering with the burst pattern is discouraged.

17. A computer usable non-transitory medium having a computer readable program code embodied therein, said computer readable program code adapted to form the following means when executed on a computer:
    means for sensing tire pressure information;
    means for storing the sensed tire pressure information in a transmission buffer;
    means for executing a control program; and means for transmitting a burst having a burst pattern from the transmission buffer to an external receiver device, the burst comprising the tire pressure information according to a plurality of communications formats for a plurality of automobile manufacturers, the burst pattern being incorporated into the control program and not associated with a manufacturers' code, wherein compilations of the control program that are associated with modifications to the burst pattern are made only by a manufacturer such that unauthorized tampering with the burst pattern is discouraged.

* * * * *